United States Patent [19]

Reuting

[11] 3,949,276

[45] Apr. 6, 1976

[54] PLUG-IN TYPE RELAY

[75] Inventor: Hans-Werner Reuting, Peine, Germany

[73] Assignee: Elmeg Elektro-Mechanik GmbH, Peine, Germany

[22] Filed: Feb. 10, 1975

[21] Appl. No.: 548,360

Related U.S. Application Data

[63] Continuation-in-part of Ser. No. 485,322, July 3, 1974.

[30] Foreign Application Priority Data

Feb. 15, 1974 Germany ........................... 2407185

[52] U.S. Cl. ................. 317/113; 335/202; 200/281

[51] Int. Cl.$^2$ ........................ H02B 1/02; H02B 1/18

[58] Field of Search ........ 200/51, 281, 293; 248/27; 335/202; 339/17 CF; 317/99, 101 CC, 101 CP, 112, 113, 118

[56] References Cited

UNITED STATES PATENTS

| | | | |
|---|---|---|---|
| 2,530,945 | 11/1950 | Chapman | 317/113 |
| 3,331,991 | 7/1967 | Carlisle | 317/113 |
| 3,701,077 | 10/1972 | Kelly, Jr. | 317/101 CP |
| 3,749,873 | 7/1973 | Harper | 335/202 |
| 3,846,734 | 11/1974 | Pauza | 317/101 CP |

*Primary Examiner*—Gerald P. Tolin
*Attorney, Agent, or Firm*—Ralf H. Siegemund

[57] ABSTRACT

A relay of rather flat construction has contacts arranged along its narrow sides and is received in a circumscribing frame of the same or smaller height with downwardly projecting terminals extending from contact springs which make contact with the relay contacts. These contact springs are disposed in grooves of the frame and ridges between the grooves hold the frame on the relay body in frictional engagement therewith.

8 Claims, 1 Drawing Figure

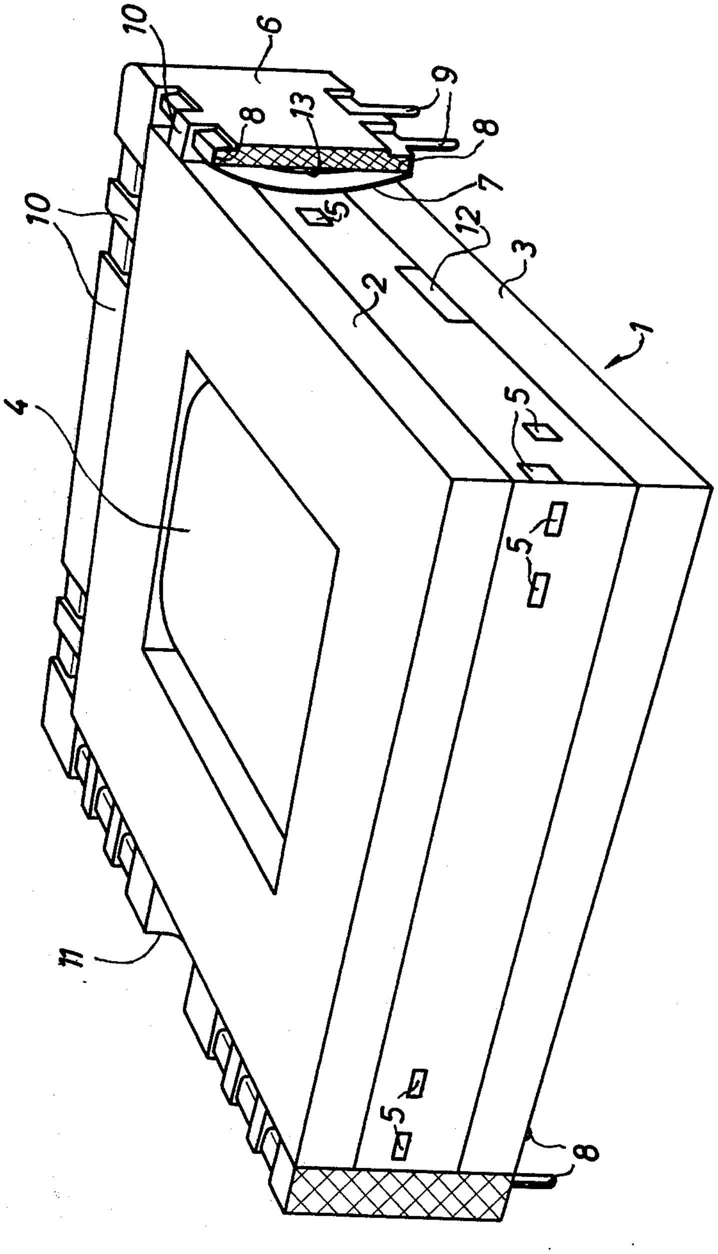
1
2
3
4
5
6
7
8
9
10
11
12
13

PLUG-IN TYPE RELAY

This is a continuation in part application of my application Ser. No. 485,322 filed July 3, 1974.

BACKGROUND OF THE INVENTION

The present invention relates to a socket construction for a plug-in type relay. Quite frequently it is desired to plug-in relays, for example, in printed circuit cards or other base elements which receive the socket for such a relay. Known sockets are comprised, for example, of a base plate and soldering vanes or terminals project from the underside thereof while the upper side is provided with plugs to receive plug pins on the relay. Thus, the socket is soldered to the card, and the relay when plugged in is mounted on top. Such sockets enable the relay to be easily inserted and replaced, without the need for making soldering connections. However, in many cases, such sockets are actually unsuitable for mounting a relay on a printed circuit board constructed as cards, as the socket requires additional height for the construction.

If one considers that PC-cards are often mounted in racks and in rather closely spaced relation it can readily be seen that this plug and socket relay assembly will not fit into the space between two cards. It is then necessary to omit one card, which leads to an increased volume of the construction and to inferior space utilization.

DESCRIPTION OF THE INVENTION

It is an object of the present invention to provide a simple socket for a relay, which socket requires no additional constructional height.

It is another object of the present invention to provide for a new combination of plug-in relay and socket for improved relay mounting facilities.

According to the invention, there is provided a socket for a relay having contacts provided laterally, and along the periphery thereof; the socket is comprised of a frame which is open above and below, and springs are provided in the interior of the frame facing the small sides of the relay for making contact with the contacts of the relay, the springs being connected to or integral with soldering vanes or terminals projecting downwards from the frame.

Such frames can be manufactured readily, for example of synthetic material or rubber and require no greater height than the relay itself, as no base is provided, so that the relay on insertion is pressed directly against the corresponding printed circuit board, on which the frame is soldered or affixed otherwise. Such a socket is at the most of the same height as the relay it receives itself, and usually a little lower than the relay so that it can readily be accommodated within the normal card separation.

Advantageously, ridges are provided in the frame, between the springs and extending to the perimeter of the inserted relay. Thus, these ridges abut the inserted relay laterally and determine its exact position, so that the springs are in an exact manner in contact with the contacts which are provided on the narrow sides of the relay.

Advantageously these ridges are so constructed that the springs are mounted in grooves defined between adjacent ridges of the frame (on the inside thereof). The springs are at least partially protected by these grooves, so that upon withdrawing the relay voltage may still be appled to the frame contacts without danger. Moreover, the arrangement of these contact springs in such grooves protects them against unintentionally bending so that they retain their determined positions with respect to the contacts of a relay to be inserted.

Subminiature relays may have many contacts and coil connections and these should all be accommodated on the outer periphery of the relay; alternatively, i.e. in the case of less numerous connections, it is desirable to have some choice in the placement of the corresponding contacts along the narrow side perimeter of the relay, thereby facilitating the construction, without however placing the the contacts and the soldering tags, vanes or terminals of the socket too close to each other. In furtherance of these objectives, it is further proposed to provide the narrow sides of the relay with perpendicular grooves, and the contacts of the relay are provided on the base surfaces of the grooves. These grooves are offset with respect to each other by a particular regular dimension, and the socket is formed with contacts and soldering terminals also being offset with respect to each other by the same dimension.

In an advantageous embodiment of the invention, the contact springs on the frame consist of leaf springs running from points of support at the upper frame edge to lower ones while being bent outwards in the middle region. Upper and lower portions of the springs can readily be inserted in the frame; their upper and lower bent ends are mounted on a support of the frame simply by snapping-in.

According to a further development of the invention, it is provided that the soldering vanes or terminals are movably fixed. This can, for example, be effected in that the soldering terminals are integral extensions of the leaf springs which are cut free and turned downwards. The terminals are, therefore, not fixed to the frame but loosely seated to be displaceable. The resiliency of the outward bend portion of the respective spring contact is instrumental here. Such movability of the terminals reduces the (mechanical) loading of them in the printed circuit board, for example, due to thermal expansion of the materials or other mechanical influences. Soldering vanes and terminals when held in a rigid manner, easily leads to unsound "cold" joints upon loading.

Upwardly open recesses are provided on the upper edge of the frame for gripping the relay so that it can be easily removed from the frame. Two such mutually opposed recesses ensure in a simple manner that the relay may be grasped with thumb and index finger and withdrawn from the frame. Although the relay is normally held sufficiently firmly in the frame by springs and also by the ridges, according to a further feature, the relay has recesses along its narrow sides and resilient projections of the frame can grip to hold the relay in its inserted position. Such projections can for example consist of the material of the frame, if this is sufficiently elastic, or they may comprise springs, which are mounted on the frame in a suitable manner.

DESCRIPTION OF THE DRAWINGS

While the specification concludes with claims particularly ponting out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a perspective view of a plug-in type relay with socket, a portion of the socket being cut away for clarity.

The relay 1 as illustrated comprises two quadrilaterally shaped magnetic yokes 2 and 3 each having a quadrilateral opening and a magnetic coil 4 is arranged inbetween and extends to some extent into the rectangular openings of the yokes. Contacts 5 are mounted at the lateral, narrow sides of the relay 1. Specifically, these contacts 5 are mounted in an insulative structure (such as corner pieces) and are exposed at the small side periphery of the relay. These contacts 5 provide the current feed to the switching contacts (not shown) in the interior of the relay as well as to the magnetic coil 4. Please note, that in the description of this invention I refer only to contacts for contact making between the relay and the frame of the socket. The relay switching contacts proper are disposed on the inside. As an example here, I refer to my copending applications Ser. No. 485,322, filed July 3, 1974, and Ser. No. 502,802 filed Sept. 3, 1974.

A socket of the relay is constructed as a frame 6 whose height corresponds to the height of the relay 1 and whose interior dimensions correspond to the external dimensions of the relay 1 so that it can receive the same. Grooves 13 are provided on the inside surface of the frame, and leaf springs 7 are mounted in these grooves, having generally vertical orientation, as have the grooves, but being bent outwards and towards the interior of the frame. For mounting the leaf springs 7 they are turned in (bent off) at their upper and lower ends and these turns enclose the supports 8 provided on the frame 6. The leaf springs 7 may be held at these supports 8 only by their spring action.

A further part of each leaf spring 7, at the lower end thereof, is cut free and bent back downwards, to form soldering vanes or terminals 9. The terminals will be inserted into appropriate aperatures of a printed circuit board and soldered thereto. These soldering terminals or vanes 9 are, therefore, not rigidly connected to the frame 6, but they are movable to a certain extent. This displaceability is advantageous when soldering the terminals 9 into printed circuit boards or the like, as due to the yieldability (movability) of the terminals as a whole mechanical stresses cannot occur at the joints; such stress might affect the solder joints adversely.

The grooves 13 and the locations of the leaf springs 7 on the frame 6 are defined by ridges 10 which extend as far as the yokes 2 and 3 of the relay and determines its exact position. Moreover, these ridges actually grip the relay, apart from the operation of the springs 7, to prevent an undesired slipping of the relay out of the frame 6. In other words the ridges 10, arranged all around the frame 6 but on the inside thereof engage frictionally the relay body 1 for holding it. Such a holding effect can be further enhanced if the entire frame 6 is made of a resilient and/or elastic synthetic material or of rubber, which resiliently augments the frictional engagement with the inserted relay.

Recesses, such as 12, are provided laterally on the relay, into which resilient projections of the frame may grip, to provide for additional security of the relay against undesired separation from the frame 6. If elastic material is used for the frame 6, these projections may be inwardly extending protrusions integral with and extending from the frame. It is also possible however to construct these projections as inserted springs or the like, which grip into the recesses 12.

At times, however, it may be necessary to separate the relay 1 from the frame 6. In order to facilitate such separation, upwardly open recesses are provided at the upper edge of the frame; only one recess, 11, is visible in the drawings. These recesses make possible gripping of the relay proper with the fingers or with pliers or the like.

It will be understood that the proposed invention is not limited to the described embodiment. Many modifications are possible without departing from the scope of the invention. For example the relay need not as described possess flat side surfaces. The side surfaces of the relay can instead be provided with vertically running grooves, and the contacts 5 for the electrical supply of the relay are provided therein to be in recessed disposition with regard to the relay body as such. In this case the springs 7 are so constructed and arranged for sufficient forward projection so that they can duly come into contact with the recessed contacts in such grooves of the relay. Moreover, it is also possible that the height of the frame 6 is less than the height of the relay. In this case the recesses 11 for gripping of the relay are not required.

I claim:

1. A socket and a relay, the relay having contacts provided laterally on the periphery thereof, the periphery having a particular height, said socket comprising a frame circumscribing the relay about the periphery thereof and being open above and below, the frame having a height not exceeding said height; and springs mounted on the inside of the frame bearing against said relay and making contact with the contacts of the relay, the contacts of the relay remain inside of the frame without projecting from the frame, the springs being connected to soldering terminals, the terminals projecting downwards from the frame.

2. The socket and relay as in claim 1, wherein ridges are provided between the springs, the ridges being part of the frame and extending as far as the periphery of the inserted relay.

3. The socket and relay as in claim 2, wherein the springs are mounted in grooves as defined between the ridges on the inside of the frame.

4. The socket and relay as in claim 1, wherein the soldering terminals are displaceably mounted.

5. The socket and relay as in claim 1, said springs being leaf springs and being bent outwards towards the interior of the frame in their middle region and, above and below, enclosing supports provided on the frame.

6. The socket and relay as in claim 5, wherein the soldering terminals constitute respectively integral parts of the leaf springs which are cut free and turned downwards.

7. The socket and relay as in claim 1, wherein recesses are provided at the edge of the frame which are open outwardly of the frame for gripping of the relay.

8. The socket and relay as in claim 1 with said relay having recesses laterally on the sides of the relay, in which elastic projections of the frame grip to hold the relay in place.

* * * * *